United States Patent
VanBlon et al.

(10) Patent No.: US 10,545,230 B2
(45) Date of Patent: Jan. 28, 2020

(54) AUGMENTED REALITY VIEW ACTIVATION

(71) Applicant: LENOVO (Singapore) PTE. LTD., New Tech Park (SG)

(72) Inventors: Russell Speight VanBlon, Raleigh, NC (US); Robert James Kapinos, Durham, NC (US); Timothy Winthrop Kingsbury, Cary, NC (US); Scott Wentao Li, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 62 days.

(21) Appl. No.: 15/611,626

(22) Filed: Jun. 1, 2017

(65) Prior Publication Data

US 2018/0349584 A1 Dec. 6, 2018

(51) Int. Cl.
*G01S 13/89* (2006.01)
*G01S 17/89* (2006.01)

(52) U.S. Cl.
CPC .............. *G01S 13/89* (2013.01); *G01S 17/89* (2013.01)

(58) Field of Classification Search
CPC ........ G06F 21/32; G06F 1/1686; G01S 13/89; G01S 17/89; G06K 9/209; G06T 19/006
See application file for complete search history.

(56) References Cited

U.S. PATENT DOCUMENTS

| | | | | |
|---|---|---|---|---|
| 9,132,773 | B2* | 9/2015 | Washlow | G01S 7/003 |
| 9,511,730 | B1* | 12/2016 | Wu | G08G 1/166 |
| 9,811,818 | B1* | 11/2017 | Xing | A61B 10/0051 |
| 10,037,689 | B2* | 7/2018 | Taylor | G08G 1/0141 |
| 10,304,338 | B1* | 5/2019 | Lau | G08G 1/162 |
| 2014/0225978 | A1* | 8/2014 | Saban | H04N 1/622 348/14.07 |
| 2014/0247281 | A1* | 9/2014 | Ellenby | G06T 19/006 345/633 |
| 2015/0179066 | A1* | 6/2015 | Rider | G08G 1/04 701/31.5 |
| 2015/0251599 | A1* | 9/2015 | Koravadi | B60Q 9/008 340/903 |
| 2016/0098861 | A1* | 4/2016 | Sisbot | G06T 19/006 345/633 |
| 2016/0170996 | A1* | 6/2016 | Frank | G06F 16/24578 707/748 |
| 2016/0170998 | A1* | 6/2016 | Frank | G06F 16/24578 707/748 |
| 2016/0171777 | A1* | 6/2016 | Todeschini | G06T 19/006 345/633 |

(Continued)

OTHER PUBLICATIONS

Avery Thompson, "This Cyborg Vision Could Help Helicopter Pilots See Through Smoke and Fog", http://www.popularmechanics.com/technology/a21676/augmented-reality-helicopter-pilots, Jul. 6, 2016, pp. 1-3.

(Continued)

*Primary Examiner* — Mia M Thomas
(74) *Attorney, Agent, or Firm* — Kunzler Bean & Adamson

(57) ABSTRACT

For augmented reality view activation, a processor determines if an optical image captured by the camera and a sensor image captured by the sensor satisfy an activation policy. In response to the activation policy being satisfied, the processor activates an augmented reality view that comprises the sensor image.

15 Claims, 7 Drawing Sheets

(56) References Cited

U.S. PATENT DOCUMENTS

| | | | |
|---|---|---|---|
| 2016/0342838 A1* | 11/2016 | Shah | G06K 9/00671 |
| 2016/0366598 A1* | 12/2016 | Gallagher | G08G 1/161 |
| 2016/0379486 A1* | 12/2016 | Taylor | G08G 1/0141 |
| | | | 340/905 |
| 2017/0178514 A1* | 6/2017 | Dry | H04L 67/00 |
| 2017/0308800 A1* | 10/2017 | Cichon | G06N 20/00 |
| 2019/0129039 A1* | 5/2019 | Schubert | G01S 17/933 |
| 2019/0187783 A1* | 6/2019 | Sevostianov | G06F 3/012 |

OTHER PUBLICATIONS

Eric Limer, "Trippy Lidar Wireframes Show How Self-Driving Cars Might See the World", http://www.popularmechanics.com/technology/a18153/trippy-lidarwireframes-show-how-self-driving-cars-might-see-the-world/, Nov. 11, 2015, pp. 1-3.

* cited by examiner

260

System Data

AUGMENTED REALITY VIEW ACTIVATION

FIELD

The subject matter disclosed herein relates to augmented reality views and more particularly relates to activating augmented reality views.

BACKGROUND

Augmented reality can provide additional information to a user beyond what the user sees.

BRIEF SUMMARY

An apparatus for augmented reality view activation is disclosed. The apparatus includes a camera, a sensor, a processor, and a memory that stores code executable by the processor. The processor determines if an optical image captured by the camera and a sensor image captured by the sensor satisfy an activation policy. In response to the activation policy being satisfied, the processor activates an augmented reality view that comprises the sensor image. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
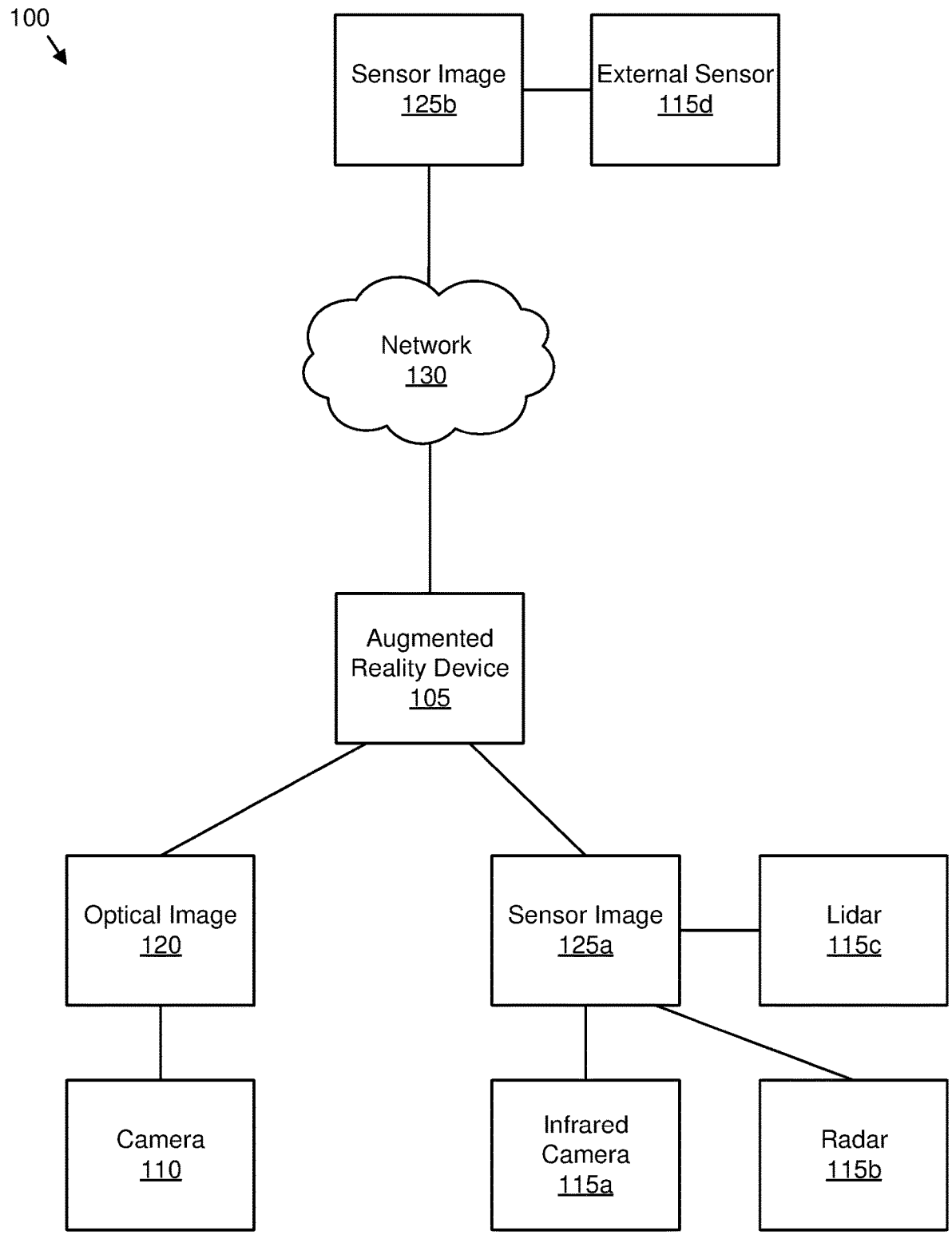
FIG. 1 is a schematic block diagram illustrating one embodiment of an augmented reality system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an augmented reality system 100. The augmented reality system 100 may provide an augmented reality view to a user through an augmented reality device 105. The system 100 includes the augmented reality device 105, a camera 110, and one or more sensors 115*a-d*. The camera 110 may generate an optical image 120. The sensors 115 may include an infrared camera 115*a*, radar 115*b*, lidar 115*c*, and the like. The sensors 115 may generate one or more sensor images 125*a-b*.

An external sensor 115*d* may communicate a sensor image 125*b* to the augmented reality device 105 through a network 130. The network 130 may be the Internet, mobile telephone network, a Wi-Fi network, a local area network, a wide-area network, or combinations thereof.

The augmented reality device 105 may provide a user with an augmented reality view that includes one or more sensor images 125. The augmented reality device 105 may be worn by the user. In addition, the augmented reality device 105 may be embedded in the windshield of an automobile and/or aircraft.

The user may elect to navigate the physical environment without the augmented reality view provided by the augmented reality device 105. Unfortunately, circumstances may arise wherein the augmented reality view may provide much-needed information to the user. The embodiments described herein determine if an optical image 120 and a sensor image 125 satisfy an activation policy. In addition, if the activation policy is satisfied, the embodiment activates an augmented reality view that includes the sensor image 125 as will be described hereafter. As a result, the user is automatically presented with the augmented reality view when the augmented reality view would be beneficial.

Figure 2A:
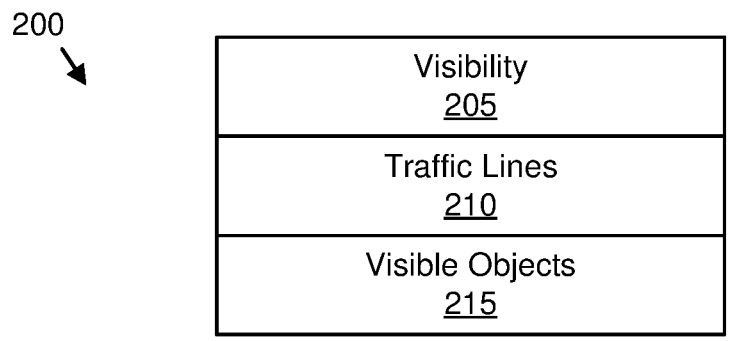
FIG. 2A is a schematic block diagram illustrating one embodiment of optical data.

FIG. 2A is a schematic block diagram illustrating one embodiment of optical data 200. The optical data 200 may be generated from the optical image 120. The optical data 200 maybe organized as a data structure in a memory. In the depicted embodiment, the optical data 200 includes a visibility 205, traffic lines 210, and visible objects 215.

The visibility 205 may indicate a visibility of the physical environment. The visibility 205 may be measured in meters of visibility. The traffic lines 210 may indicate a position of traffic lines on a road. The position of the traffic lines may be determined from the optical image 120.

The visible objects 205 may identify one or more objects that are visible in the physical environment from the optical image 120. In one embodiment, the objects are classified as stationary, moving, and potentially moving.

Figure 2B:
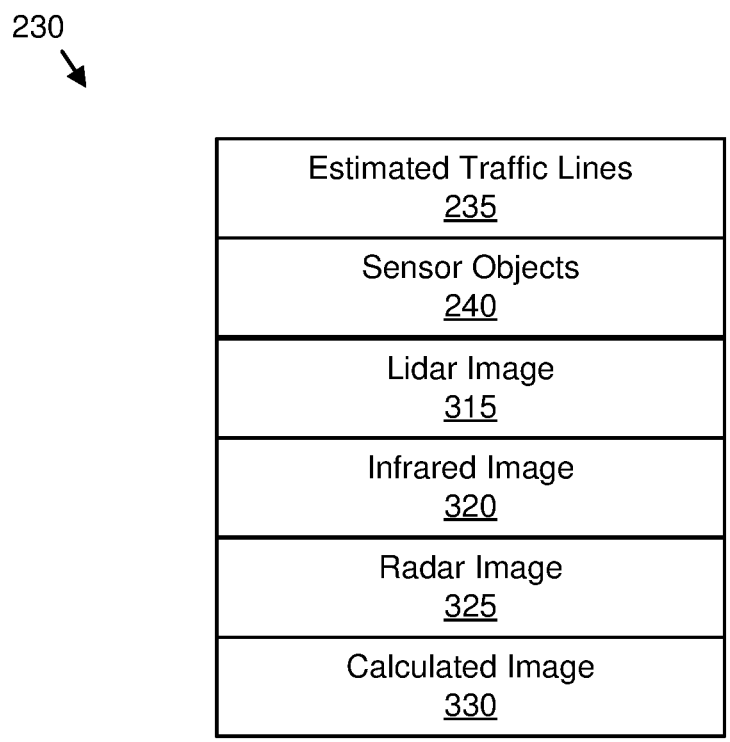
FIG. 2B is a schematic block diagram illustrating one embodiment of sensor data.

FIG. 2B is a schematic block diagram illustrating one embodiment of sensor data 230. The sensor data 230 may be generated from the sensor image 125. The sensor data 230 may be organized as a data structure in a memory. In the depicted embodiment, the sensor data 230 includes estimated traffic lines 235, sensor objects 240, a lidar image 315, an infrared image 320, a radar image 325, and a calculated image 330.

The estimated traffic lines 235 may indicate likely locations of traffic lines based on edges of a road. For example, estimated traffic lines 235 may be calculated at a center of a road, and at specified distances from the center of the road.

The sensor objects 240 may identify one or more objects from the sensor data 125 in the physical environment. The sensor objects 240 may be classified as stationary, moving, and potentially moving.

The lidar image 315 may comprise a visible spectrum image of lidar points captured by the lidar 115*c*. In one embodiment, the lidar points are processed to generate object lines and/or object surfaces.

The infrared image 320 may comprise a visible spectrum image of an infrared sensor image 125 captured by the infrared camera 115*a*. The radar image 325 may comprise a visible spectrum image of radar echoes from the sensor data 125 captured by the radar 115*b*. The calculated image 330 may comprise a visible spectrum image that estimates an objects shape, position, and/or movement from the sensor data 125.

Figure 2C:
FIG. 2C is a schematic block diagram illustrating one embodiment of system data.
Figure 2C:
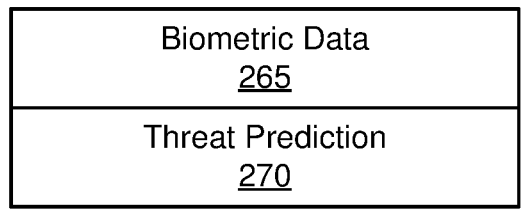

FIG. 2C is a schematic block diagram illustrating one embodiment of system data 260. The system data 260 may be used to activate the augmented reality view. The system data 260 may be organized as a data structure in a memory. In the depicted embodiment, the system data 260 includes biometric data 265, a threat probability 270, an activation policy 275, and threshold data 280.

The biometric data 265 may record biometric information for a user. The biometric data 265 may include a heart rate, eye motions, skin temperature, skin moisture, and the like.

The threat probability 270 may be calculated to estimate the probability of one or more of a collision, a bomb blast, a hidden object, and an intersecting trajectory. The threat probability 270 may be calculated from the optical data 200 and/or the sensor data 230. For example, projected movements of moving objects may be calculated and compared with projected movements of the user. In addition, potential movements of potentially moving objects may be estimated and compared with projected movements of the user. Probabilities of a collision may be calculated as the threat probability 270.

The activation policy 275 may specify circumstances for automatically activating the augmented reality view of the augmented reality device 105. In one embodiment, the activation policy 275 is satisfied if visibility 205 is less than a visibility threshold. For example, if the visibility 205 is 40 meters and the visibility threshold is 50 meters, the activation policy 275 may be satisfied. In addition, the visibility 205 may be less than the visibility threshold due to sun glare, headlight glare, fog, rain, snow, and the like.

In one embodiment, the activation policy 275 is satisfied if traffic lines 210 are not visible. In addition, the activation policy 275 may be satisfied if the hidden object is detected. In one embodiment, the activation policy 275 is satisfied if the threat probability 270 exceeds a threat threshold. In addition, the activation policy 275 may be satisfied if user stress based on the biometric data 265 exceeds a stress threshold. The stress threshold may be an elevated heart rate, erratic eye movements, drooping and/or closing eyes, erratic maneuvering, and elevated skin temperature, elevated moisture on the skin, and the like.

The threshold data 280 may include the visibility threshold, the threat threshold, the stress threshold, and the like.

Figure 3A:
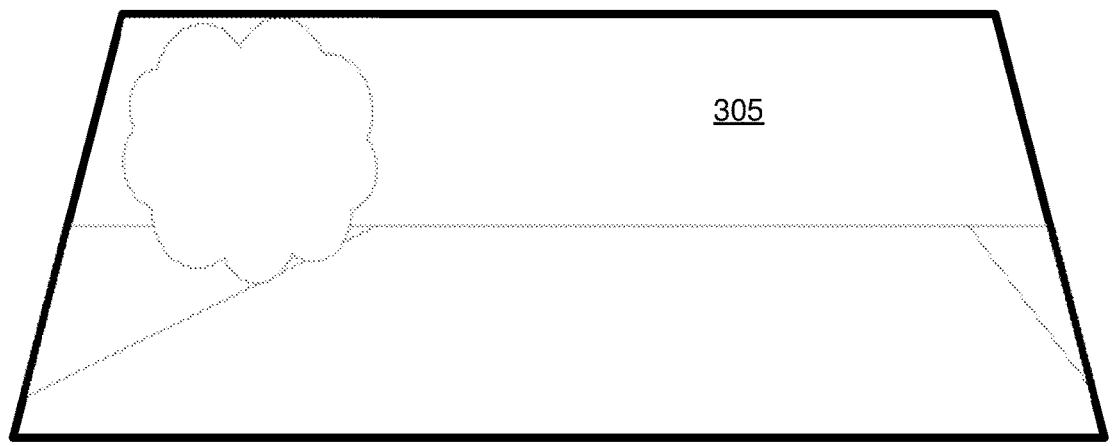
FIG. 3A is a drawing of one embodiment of a windshield view.

FIG. 3A is a drawing of one embodiment of a windshield view with an optical view 305. In the depicted embodiment, a road 340 and a bush 345 is visible. The visible objects are not sharp because of low visibility.

Figure 3B:
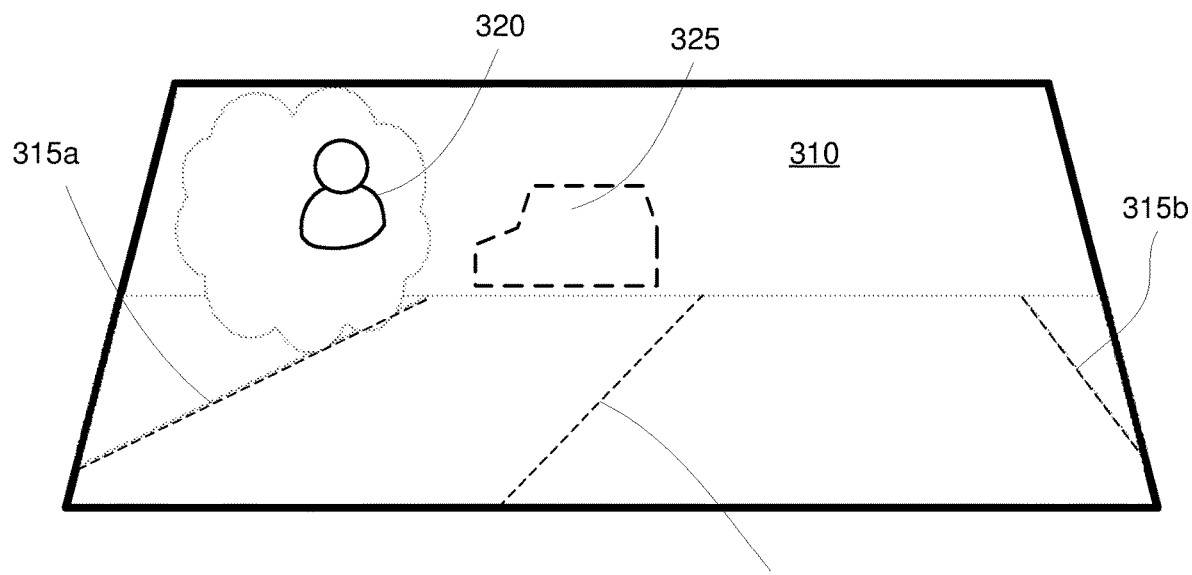
FIG. 3B is a drawing of one embodiment of a windshield view with an augmented reality view.

FIG. 3B is a drawing of one embodiment of a windshield view with augmented reality. The windshield view of FIG. 3A is shown in the augmented reality view 310. In the depicted embodiment, lidar images 315*a-b* show an edge of the road 340. In addition, an estimated traffic line 235 is shown, although no traffic lines 210 are visible in the optical view 305. The estimated traffic line 235 may be calculated from the lidar images 315*a-b* of the edge of the road 340. The lidar images 315*a-b* and the estimated traffic line 235 clearly show the user a proper traffic lane, although such visual information is less clear in the optical view 305.

An infrared image 320 is visible behind the bush 345. The infrared image 320 may alert the user to a threat that is not yet visible in the optical view 305. In addition, a radar image 325 is shown of an approaching car. The car is not visible in the optical view 305, but because the augmented reality view 310 includes the radar image 325, the approaching cars clearly discernible. The augmented reality view 310 greatly adds to the information available to the user to navigate the physical environment.

Figure 4:
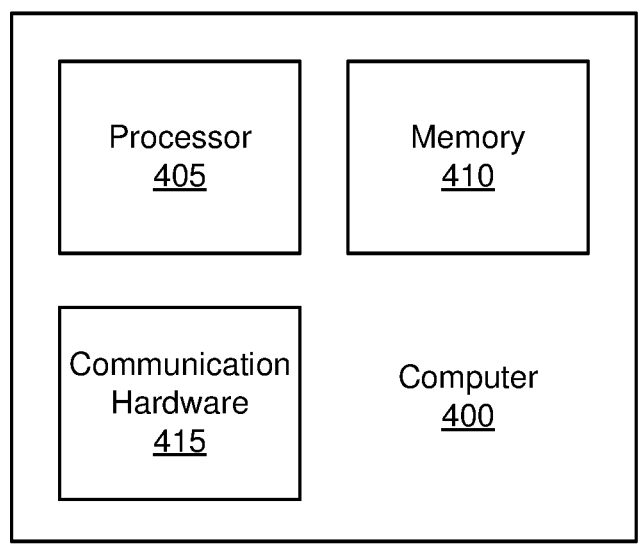
FIG. 4 is a schematic block diagram illustrating one embodiment of a computer.

FIG. 4 is a schematic block diagram illustrating one embodiment of a computer 400. The computer 400 may be embodied in the augmented reality device 105. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the camera 110, the network 130, and/or the sensors 115*a-d*.

Figure 5A:
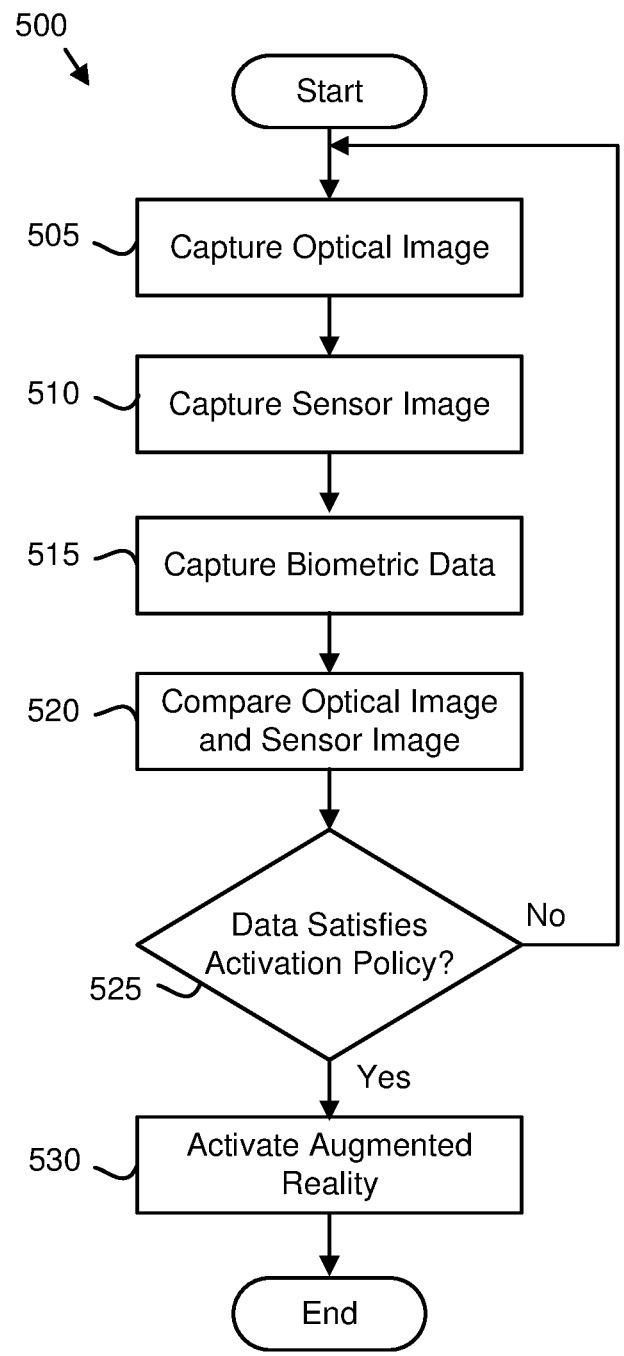
FIG. 5A is a schematic flow chart diagram illustrating one embodiment of an augmented reality view activation method.

FIG. 5A is a schematic flow chart diagram illustrating one embodiment of an augmented reality view activation method 500. The method 500 may determine to automatically activate an augmented reality view 310. The method 500 may be performed by the processor 405.

The method 500 starts, and in one embodiment, the camera 110 captures 505 the optical image 120. The camera 110 may communicate the optical image 120 to the augmented reality device 105.

A sensor 115 may capture 510 a sensor image 125. The sensor 115 may communicate the sensor image 125 to the augmented reality device 105.

In one embodiment, the processor 405 captures 515 biometric data 265 from the user. The processor 405 may employ one or more biometric sensors to capture the biometric data 265.

The processor 405 may compare 520 the optical image 120 and the sensor image 125. In one embodiment, the processor 405 determines if sensor objects 240 in the sensor image 125 are also discernable as visible objects 215 in the optical image 120. The processor 405 may flag each object that is discernable in the sensor image 125 and not visible in the optical image 120, wherein not visible includes discernable with reduced acuity.

The processor 405 may determine 525 if the optical image 120 and the sensor image 125 satisfy an activation policy 275. The determination 525 of the satisfaction of the activation policy 275 is described in more detail in FIG. 5B. If the images 120/125 do not satisfy the activation policy 275, the camera 110 continues to capture 505 optical images 120.

If the activation policy 275 is satisfied, the processor 405 may automatically activate 530 the augmented reality view 310 and the method 500 ends. The augmented reality view 310 may be automatically activated 530 to provide the user with the added information of the augmented reality view 310 as rapidly as possible.

Figure 5B:
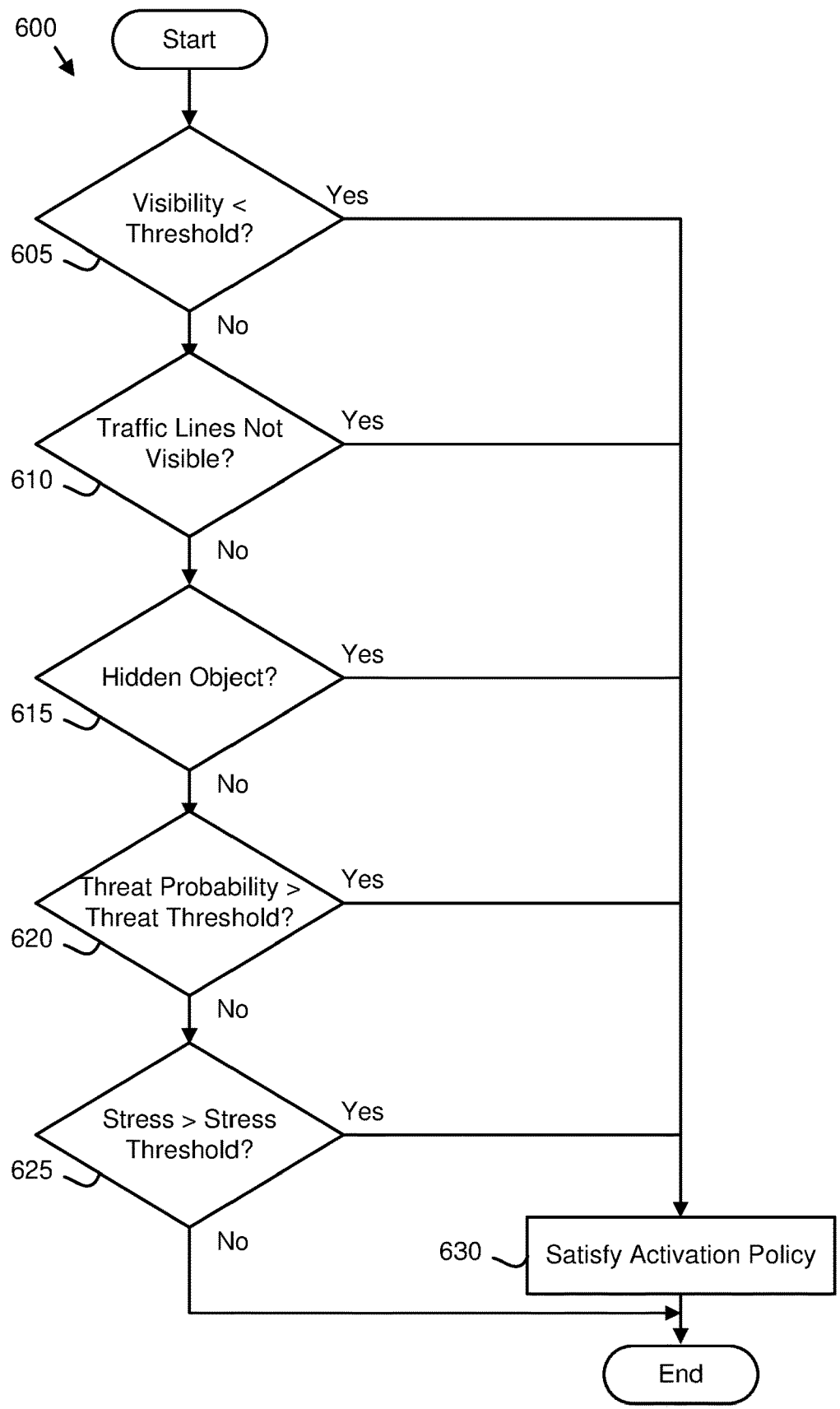
FIG. 5B is a schematic flow chart diagram illustrating one embodiment of an activation policy determination method.

FIG. 5B is a schematic flow chart diagram illustrating one embodiment of an activation policy determination method 600. The activation policy determination method 600 may determine when to automatically activate the augmented reality view 310. The method 600 may perform step 525 of FIG. 5A. The method 600 may be performed by the processor 405.

The method 600 starts, and in one embodiment, the processor 405 determines 605 if the visibility 205 is less than the visibility threshold. In a certain embodiment, the visibility V 205 is calculated using Equation 1, where d is a distance to a furthest visible object 215, G is a glare brightness, and B is an average brightness of the optical view 305.

$$V = d/\sqrt{(G/B)} \qquad \text{Equation 1}$$

The distance d may be determined from the lidar image 315 and/or the radar image 325. If the visibility 205 is less than the visibility threshold, the activation policy 275 may be satisfied 630 and the method 600 ends.

If the visibility 205 is not less than the visibility threshold, the processor 405 determines 610 if the traffic lines 210 are not visible. In one embodiment, the traffic lines 210 are tested for where indicated by the estimated traffic lines 235. If the traffic lines 210 are not visible, the activation policy 275 may be satisfied 630.

If the traffic lines 210 are visible, the processor may determine 615 if a hidden object is detected. The hidden object may be detected as a sensor object 240 for which there is no corresponding visible object 215. The infrared image 320 in FIG. 3B is one example of a hidden object. If the hidden object is detected, the activation policy 275 may be satisfied 630.

If a hidden object is not detected, the processor 405 may determine if the threat probability 270 exceeds the threat threshold. In one embodiment, the processor 405 calculates the threat probability TP 270 as a ratio of a safety radius SR to the closest projected position CPP of a sensor object 240 relative to the user and/or the user's vehicle as illustrated in Equation 2.

$$TP = SR/CPP \qquad \text{Equation 2}$$

If the threat probability 270 exceeds the threat threshold, the activation policy 275 may be satisfied 630. If the threat probability 270 does not exceed the threat threshold, the processor 405 may determine if user stress based on the biometric data 265 exceeds the stress threshold. The stress threshold may be exceeded by an elevated heart rate. In addition, the stress threshold may be exceeded by erratic eye movements. The stress threshold may further be exceeded by erratic maneuvering. In addition, the stress threshold may be exceeded by an elevated skin temperature. Alternatively, the stress threshold may be exceeded by a low skin temperature and/or significant detectable moisture on the skin. In one embodiment, the stress threshold is exceeded by a lack of eye movement.

If the user stress based on the biometric data 265 does not exceed the stress threshold, the activation policy 275 is not satisfied and the method 600 ends. If the user stress exceeds the stress threshold, the activation policy 275 is satisfied 630 and the method 600 ends.

The embodiments determine if the optical image 120 captured by the camera 110 and the sensor image 125 captured by the sensor 115 satisfy the activation policy 275. In response to the activation policy 275 being satisfied, the embodiments activate the augmented reality view 310. As a result, the user immediately and automatically has the benefit of the additional information provided by the sensor images 120 in the augmented reality view 310. Therefore, the user is able to more safely and effectively navigate the physical environment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a camera;
   a sensor;
   a processor;
   a memory that stores code executable by the processor to:
   determine if an optical image captured by the camera and a sensor image captured by the sensor satisfy an activation policy by a threat probability that exceeds a threat threshold and by traffic lines that are not visible, wherein the threat probability is calculated as a ratio of a safety radius to a closest projected position of a sensor object; and
   in response to the activation policy being satisfied, activating an augmented reality view that comprises the sensor image.

2. The apparatus of claim 1, wherein the activation policy is further satisfied if visibility is less than a visibility threshold.

3. The apparatus of claim 1, wherein the activation policy is further satisfied if a hidden object is detected.

4. The apparatus of claim 1, wherein the code is further executable by the processor to capture biometric data.

5. The apparatus of claim 4, wherein the activation policy is further satisfied if user stress based on the biometric data exceeds a stress threshold.

6. The apparatus of claim 5, wherein the sensor image comprises one or more of a lidar image, an infrared image, a radar image, and a calculated image.

7. A method comprising:
   determining, by use of a processor, if an optical image captured by a camera and a sensor image captured by a sensor satisfy an activation policy by a threat probability that exceeds a threat threshold and by traffic lines that are not visible, wherein the threat probability is calculated as a ratio of a safety radius to a closest projected position of a sensor object; and
   in response to the activation policy being satisfied, activating an augmented reality view that comprises the sensor image.

8. The method of claim 7, wherein the activation policy is further satisfied if visibility is less than a visibility threshold.

9. The method of claim 7, wherein the activation policy is further satisfied if a hidden object is detected.

10. The method of claim 7, the method further comprising capturing biometric data.

11. The method of claim 10, wherein the activation policy is further satisfied if user stress based on the biometric data exceeds a stress threshold.

12. The method of claim 7, wherein the sensor image comprises one or more of a lidar image, an infrared image, a radar image, and a calculated image.

13. A program product comprising a non-transitory computer readable storage medium that stores code executable by a processor, the executable code comprising code to:
   determine if an optical image captured by a camera and a sensor image captured by a sensor satisfy an activation policy by a threat probability that exceeds a threat threshold and by traffic lines that are not visible, wherein the threat probability is calculated as a ratio of a safety radius to a closest projected position of a sensor object; and
   in response to the activation policy being satisfied, activating an augmented reality view that comprises the sensor image.

14. The program product of claim 13, wherein the activation policy is further satisfied if visibility is less than a visibility threshold.

15. The program product of claim 13, wherein the activation policy is further satisfied if a hidden object is detected.

* * * * *